2 Sheets—Sheet 1

T. E. DANIELS.
Mold for Artificial Marble-Coffin.

No. 205,731. Patented July 9, 1878.

Witnesses:
Donn P. Twitchell.
Will W. Dodge.

Inventor:
T. E. Daniels
By Dodge & Son
Attys

2 Sheets—Sheet 2.

T. E. DANIELS.
Mold for Artificial Marble-Coffin.

No. 205,731. Patented July 9, 1878.

Witnesses:
Donn P. Twitchell
Will N. Dodge

Inventor:
T. E. Daniels
By Dodge & Son
Attys.

UNITED STATES PATENT OFFICE.

TAYLOR E. DANIELS, OF CHICAGO, ILLINOIS.

IMPROVEMENT IN MOLDS FOR ARTIFICIAL-MARBLE COFFINS.

Specification forming part of Letters Patent No. 205,731, dated July 9, 1878; application filed January 8, 1878.

*To all whom it may concern:*

Be it known that I, TAYLOR E. DANIELS, of Chicago, in the county of Cook and State of Illinois, have invented certain Improvements in Molds for Artificial-Marble Coffins, of which the following is a specification:

My invention relates to molds for the manufacture of artificial-stone coffins; and the improvements consist in arranging a core to be inserted into and removed from the mold from below, and in certain devices or mechanism for operating the core, as hereinafter more fully explained.

Figure 1:
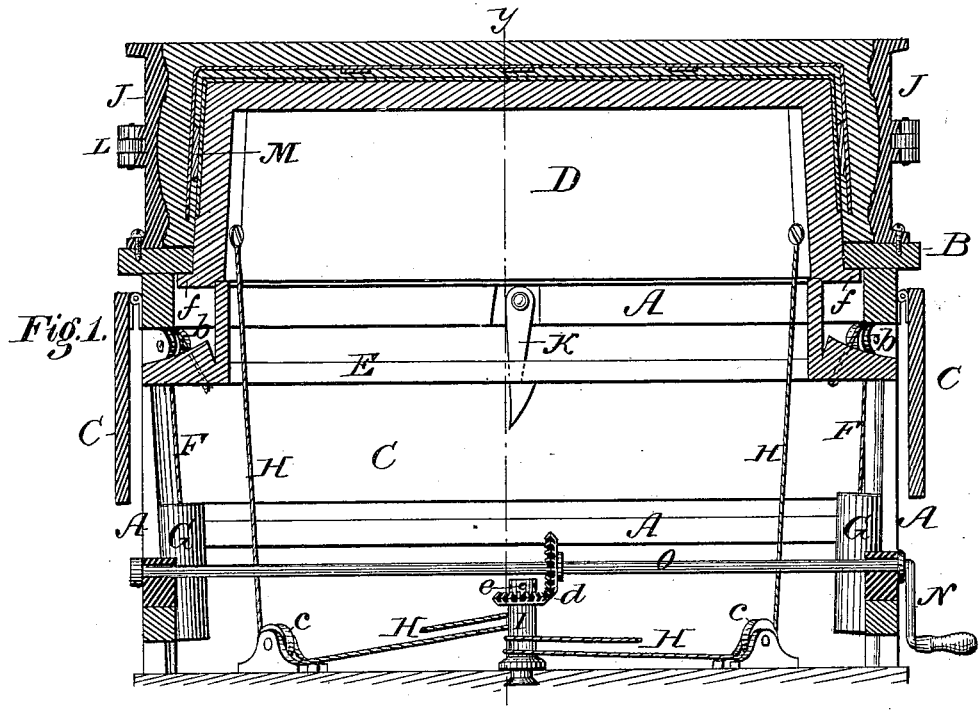
Figure 2:
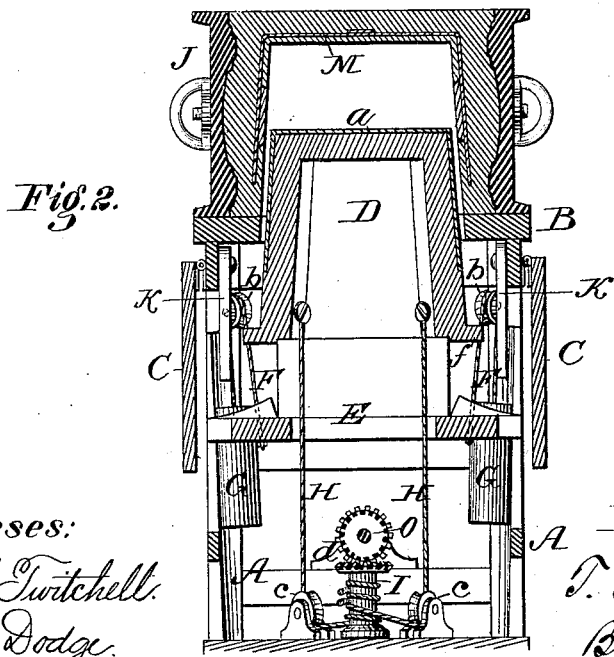
Figure 3:
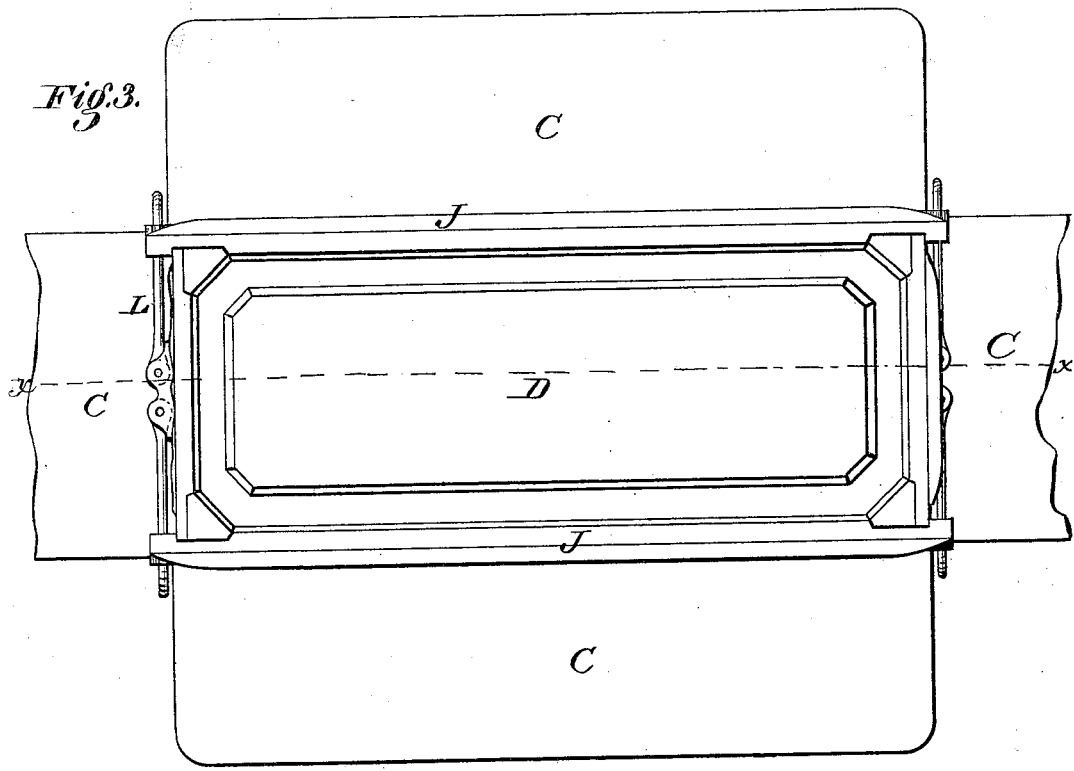
Figure 4:
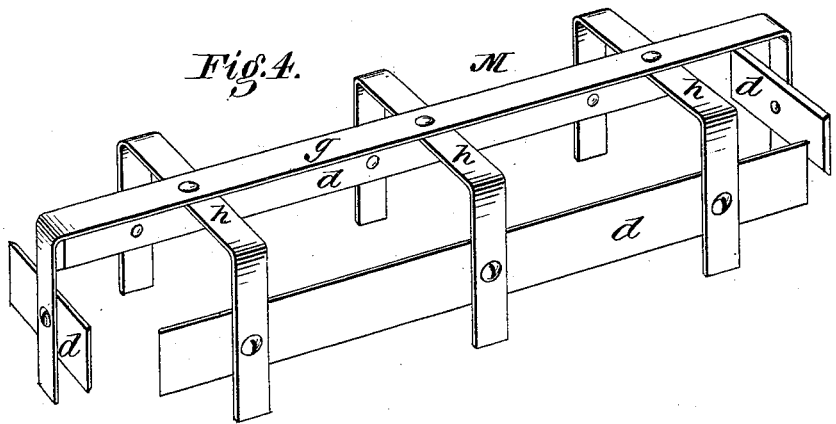

In the accompanying drawings, Figure 1 represents a longitudinal vertical section of my improved apparatus on the line $x\ x$ of Fig. 3; Fig. 2, a transverse vertical section on the line $y\ y$ of Fig. 1; Fig. 3, a top-plan view, and Fig. 4 a perspective view of a skeleton-frame to be embedded in the coffin in molding.

In molding coffins of this class it is customary to cast them in an inverted position, or bottom side upward, and it is therefore necessary to raise the entire mold and its contents in order to remove the core. This requires a great deal of labor, and is, moreover, a difficult operation; and to avoid this difficulty is the object of my present invention.

To this end I construct a strong frame, A, upon which I place, in a horizontal position, the base or bottom plate B of the mold J, as shown in Figs. 1 and 2. The mold may be of any suitable construction capable of being separated to remove the coffin therefrom. Suitable leaves or shelves C are hinged to the frame A, and arranged to be swung up and held in a horizontal position, forming a platform around the mold, as shown in Fig. 3, upon which to place materials, tools, &c.

D represents the core, which is covered or faced with galvanized iron, tin, or other suitable material $a$, to prevent moisture from affecting the same, and which is mounted upon a frame, E, arranged to move vertically within the frame A. The frame E and core D are sustained by means of cords F, passing over pulley $b$ at the top of the frame A, and furnished at their opposite ends with weights G, which are just sufficient to balance the frame E and core D. This arrangement enables the core to be readily raised or lowered at will, the core, when raised, occupying the position indicated in Fig. 1, and when lowered falling flush with or slightly below the face of the bottom or base plate B, through which it passes, and in which it snugly fits when in position for use.

When in its elevated position ready for use, the core D, seated upon the frame E, is supported and held up by means of two or more large hooks, K, which engage under the frame, as shown in Fig. 1, said hooks being attached to the main frame A at their upper ends, and arranged to swing under and engage with the frame E by reason of their weight. The core D is slightly tapering in form, so that it may be readily withdrawn from the mold, and is made of such size as to fit exactly the opening in the base-plate B when in position for use. It is also provided with a projecting flange, $f$, around the bottom, to bear against the base-plate B and form a tight joint.

When it is desired to remove the core D from the mold the hooks K are disengaged from the frame E, when the core and frame are free to be drawn down away from the mold.

In practice, however, it is found that considerable force is required to start the core from the coffin or casket contained in the mold; and in order to supply the necessary power for this purpose, ropes or cords H are attached to the interior of the core, preferably one at each corner, and carried downward, each under a pulley, $c$, and thence to a common windlass, I, which latter receives motion from a crank, N, through a shaft, O, and bevel-pinions $d$, or which may be operated by means of levers inserted into holes $e$ in the upper end of the windlass, as shown in Fig. 1. By this arrangement all the ropes H are caused to draw simultaneously and evenly upon the core, causing it to be drawn out evenly and without twisting or binding. The weight of the core and its supporting-frame E being sustained and balanced by the weights G, it will be seen that the core is prevented from falling suddenly when released from the mold.

In using this apparatus, the core is elevated to the position indicated in Fig. 1, and there fastened as above described, and a skeleton-frame, M, consisting of a longitudinal strip of metal, $g$, to extend along the bottom and up the ends, and similar strips $h$, placed at right angles thereto, to extend across the bottom and up the sides of the coffin or casket, and provided both on the sides and ends with wooden strips $d$, to which the upholstering, &c., may be tacked, is placed upon the core D, as shown in Fig. 1. The mold J is then placed in position around the core and locked together, leaving the proper space between its interior and the core for the reception of cement or other material from which the coffin or casket is to be made. As this is placed in the mold the frame M is thoroughly embedded in the same, as shown in Figs. 1 and 2, and serves to strengthen the coffin or casket.

It is obvious that the details of construction may be considerably modified without departing from my invention, which consists, essentially, in arranging the core to be inserted into and withdrawn from the mold from below.

Having thus described my invention, what I claim is—

1. In a mold for artificial-marble coffins, a bed or table, B, provided with a central opening, a core adapted to fit within said opening, and mechanism, substantially such as shown, for raising and lowering the core.

2. The mold consisting of the bed or table B, the outside mold-frame J thereon, and the vertically-movable core D inserted through the table from below.

3. In combination with the movable core D, the cords and weights for elevating the same, and the cords and take-up devices for drawing it downward.

4. In combination with the bed or table B and vertically-adjustable core D, locking devices K, for holding the core and table in close contact.

5. In a coffin-mold, the combination of a table, B, and outside sectional detachable mold-frame J thereon, and a core, D, mounted in and capable of being lowered through the table, substantially as described and shown.

6. The frame M, consisting of the longitudinal and transverse bars and the wooden strips, as shown, adapted to fit upon the core D, as shown, in order to be incorporated in the coffin when the mold is filled.

TAYLOR E. DANIELS.

Witnesses:
  FREDERICK A. SMITH,
  T. H. TRAVIS.